United States Patent
Reimann et al.

[11] Patent Number: 6,056,090
[45] Date of Patent: May 2, 2000

[54] BRAKE ACTUATOR

[75] Inventors: Gregor Reimann, Pentling; Karl-Heinz Roess, Ebersbach, both of Germany

[73] Assignee: DaimlerChrysler AG, Stuttgart, Germany

[21] Appl. No.: 09/159,388

[22] Filed: Sep. 23, 1998

[30] Foreign Application Priority Data

Sep. 23, 1997 [DE] Germany .......................... 197 41 865

[51] Int. Cl.⁷ .................................................. F16D 55/18
[52] U.S. Cl. ...................... 188/72.1; 188/72.4; 188/162; 188/156; 188/158
[58] Field of Search .................... 188/161, 72.4, 188/72.1, 72.8, 156, 158, 162, 71.2; 310/77; 318/372; 303/115.2, 162, 155; 60/545; 192/12 R, 13 R, 84.1

[56] References Cited

U.S. PATENT DOCUMENTS

| 5,322,146 | 6/1994 | Holl et al. ............................. 188/71.2 |
| 5,348,123 | 9/1994 | Takahashi et al. ..................... 188/71.2 |
| 5,682,965 | 11/1997 | Prinzler ................................. 188/72.4 |
| 5,782,322 | 7/1998 | Hauck et al. .......................... 188/162 |

FOREIGN PATENT DOCUMENTS

| 4312524A1 | 10/1994 | Germany . |
| 195 19 308A1 | 11/1996 | Germany . |

*Primary Examiner*—Douglas C. Butler
*Attorney, Agent, or Firm*—Evenson, McKeown, Edwards & Lenahan, P.L.L.C.

[57] ABSTRACT

A brake actuator comprises an electric motor, a conversion device for converting the rotational movement of the electric motor into a linear movement and a hydraulic transmission for transmitting the linear movement of the conversion device to an adjusting piston of a brake. The hydraulic transmission comprises at least two hydraulic pistons which independently of one another can be axially displaced in a hydraulic chamber, whose first hydraulic piston by way of a first driving element of the conversion device can be operated directly by the electric motor and whose second hydraulic piston can be operated by way of second driving element of the conversion device which can be taken along by a controllable clutch element by the first driving element.

23 Claims, 2 Drawing Sheets

BRAKE ACTUATOR

This application claims the priority of German application 197 41 865.1-21, filed in Germany on Sept. 23, 1997, the disclosure of which is expressly incorporated by reference herein.

BACKGROUND AND SUMMARY OF THE INVENTION

The invention relates to a brake actuator, comprising an electric motor, a conversion device for converting the rotational movement of the electric motor into a linear movement, and a hydraulic transmission for transmitting the linear movement of the conversion device to an adjusting piston of a brake.

The increasingly dense road traffic requires systems which, on the one hand, contribute to the driver's safety and, on the other hand, relieve the driver. In the automobile industry, the trend is in the direction of so-called autonomous driving. In the future, the driver is to be aided by so-called "by-wire systems" and, in many driving situations, can be relieved by intelligent systems. An important prerequisite of such systems is their electric controllability.

In the case of known brake systems, predominantly hydraulic or pneumatic transmission or booster devices are used by means of which the driver of a vehicle directly defines the brake intervention of a wheel brake. In order to permit, in systems of this type, driver-independent braking interventions, for example, for controlling the ranging, for an antilock system, for a wheel slip control system or the like, in addition to the necessary pressure supply by means of a relatively high pressure, high expenditures of components are required, for example, with respect to valves and the like.

For this reason, electrically operable wheel brakes have been known for some time which permit not only a direct controlling of the brake but, particularly compared to hydraulic or pneumatic braking systems, also require significantly fewer component parts. From German Patent Document 195 19 308 A1, a brake actuator with a transmission is known, for example, which brake actuator has an electric motor as a driving element, a conversion device for converting the rotational movement of the electric motor into a linear movement and a hydraulic transmission for transmitting the linear movement of the conversion device to a friction lining of a brake. In the case of the hydraulic transmission, this is implemented by means of a conversion device constructed as a spindle in that the spindle nut is frictionally connected with the electric motor and the spindle rod is frictionally connected with a hydraulic piston of the hydraulic transmission and in that, for receiving the spindle stroke, the electric motor is equipped with a hollow shaft. In the case of this brake actuator, the hydraulic piston is arranged in a closed hydraulic chamber. The advantage of this brake actuator is its compact shape, but it is a problem that, in the case of a self-locking of the transmission, a danger arises for the driver and the environment because the brake would remain in the applied position, which results in an uncontrollable danger situation.

In order to implement, in the case of an electromagnetic wheel brake, different adjusting speeds and application forces of a tensioning device by means of an electric motor, in the case of another wheel brake known from German Patent Document DE 43 12 524 A1, clutches are provided which can be switched electromagnetically. Also in the case of this wheel brake, an adjustment of the brake is achieved by means of a spindle drive. A self-locking of the transmission is also a problem in the case of this brake. Furthermore, such a brake requires a plurality of high-expenditure components parts which are often susceptible to disturbances. Furthermore, in many cases, by means of such transmissions, the maximally required application forces cannot be applied at the brake lining of the wheel brake. Finally, it is also a problem that the transmissions used in these brakes react to disturbing forces, such as lateral forces, and have an only insufficient dynamic controllability. In addition, in many cases, such transmissions cannot be used because of limited installation space situations at many wheel carriers.

It is therefore an object of the invention to further develop a brake actuator of the above-mentioned type in that, by means of components which are as insusceptible to disturbances as possible, an electrically controllable adjustment of a brake is permitted at different adjusting speeds and application forces in a very small space. In this case, the relatively low torque of an electric motor is to be converted into a high axial force for the adjustment of the brake linings.

In the case of a brake actuator of the initially described type, this object is achieved according to the invention in that the hydraulic transmission comprises at least two hydraulic pistons which can be axially displaced independently of one another in a hydraulic chamber, the first hydraulic piston being directly operable by the electric motor by way of a first driving element of the conversion device, and the second hydraulic piston being operable by a second driving element of the conversion device which can be taken along by the first driving element by means of a controllable clutch element.

As the result of the fact that two hydraulic pistons are provided whose first piston can be operated directly by the electric motor by way of a first driving element and whose second piston can be operated by a second driving element which can be taken along by the first driving element by way of a clutch element, not only different operating speeds but particularly also different operating forces can be applied on the adjusting piston by way of two hydraulic pistons designed as a primary piston and a secondary piston.

Purely in principle, the clutch element may have different constructions. In order to permit, particularly in a simple manner, an electric controllability, an advantageous embodiment provides that the clutch element is an electromagnetic friction clutch which can be electrically controlled.

Purely in principle, the rotational movement of the electric motor can also be converted in different manners into a translational movement. An embodiment, which is particularly advantageous because it requires few component parts and is easily implemented, provides that spindle drives are assigned to the hydraulic pistons, which spindle drives can be operated by the driving elements.

In order to implement different adjusting speeds, it is preferably provided that the spindle threads of the spindle drives have different pitches.

In order to furthermore achieve different application forces in a manner which technically is implemented as easily as possible, it is provided in the case of an advantageous embodiment that the hydraulic pistons have different piston surfaces which exercise different forces onto the adjusting piston. However, it is understood that the hydraulic pistons may also have the same surface. In this case, different forces can be implemented by the individual or overall controlling of the hydraulic pistons so that the adjusting piston can be acted upon by two different forces.

In the case of a different construction of the piston surfaces, as the result of the different operation of the hydraulic pistons, purely in principle, three different operating forces are conceivable.

As far as the arrangement of the hydraulic pistons is concerned, no detailed information has been supplied. Many different embodiments are also conceivable here.

An advantageous embodiment provides that the hydraulic pistons are arranged side-by-side.

Another embodiment, which, in particular, permits an extremely compact construction, provides that the hydraulic pistons are nested in one another.

Also with respect to the construction of the driving elements, many different embodiments are conceivable.

One advantageous embodiment provides that the first driving element is a first disk which has a central internal spindle thread engaging with an external spindle thread of the first hydraulic piston, which first disk engages with an external toothing in a gearwheel arranged on the motor shaft of the electric motor. Because of its construction, this externally toothed disk is part of a step-down gear in the form of a spur gear which, in a reduced manner, transmits a rotation of the motor shaft to a spindle drive which, in turn, results in an axial displacement of the first hydraulic piston.

Particularly with respect to a very compact construction, it is advantageously provided that the second driving element is a second disk which is arranged in parallel to the first disk and which, on a cylindrical projection molded to it, has an external spindle thread which engages with an internal spindle thread of the second hydraulic piston, the clutch being arranged between the first and the second disk.

In order to construct the bearings of the first and of the second disk also in a very compact manner, it is in this case preferably provided that the first and the second disk are rotationally movably disposed on one another and in each case, on one side, on a half of a housing accommodating the whole conversion device and the hydraulic transmission and, on the other side, on a guide of the hydraulic piston.

In particular, in order to ensure an emergency function of the brake actuator in the case of, for example, a self-locking of the spindle drive of the two hydraulic pistons, it is provided that the hydraulic chamber is connected with a reservoir which can be connected by way of a valve which can be controlled independently of the electric motor and of the clutch. As a result, for example, in the event of a failure of the electric motor or of the friction clutch, a return movement of the hydraulic pistons is permitted in that the reservoir is opened up by means of the separately controllable valve, whereby hydraulic liquid can flow back.

On the other hand, by means of opening the valve, it can be achieved that hydraulic fluid flows from the reservoir into the hydraulic chamber in order to, for example, compensate wear phenomena on brake disk or brake linings.

Other objects, advantages and novel features of the present invention will become apparent from the following detailed description of the invention when considered in conjunction with the accompanying drawings.

DETAILED DESCRIPTION OF THE DRAWINGS

Figure 1:
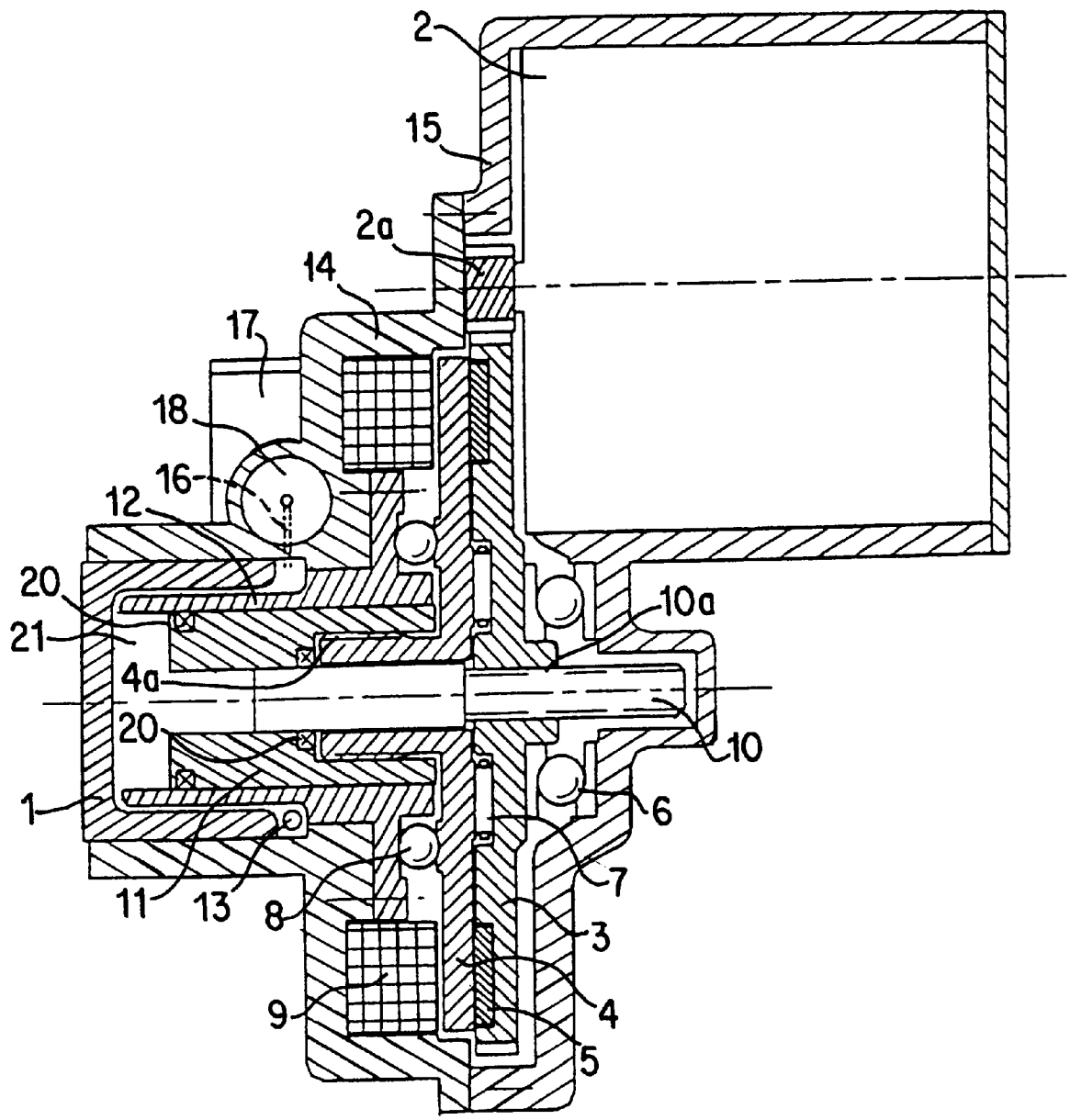
FIG. 1 is a sectional view of an embodiment of an actuator which uses the invention.
Figure 2:
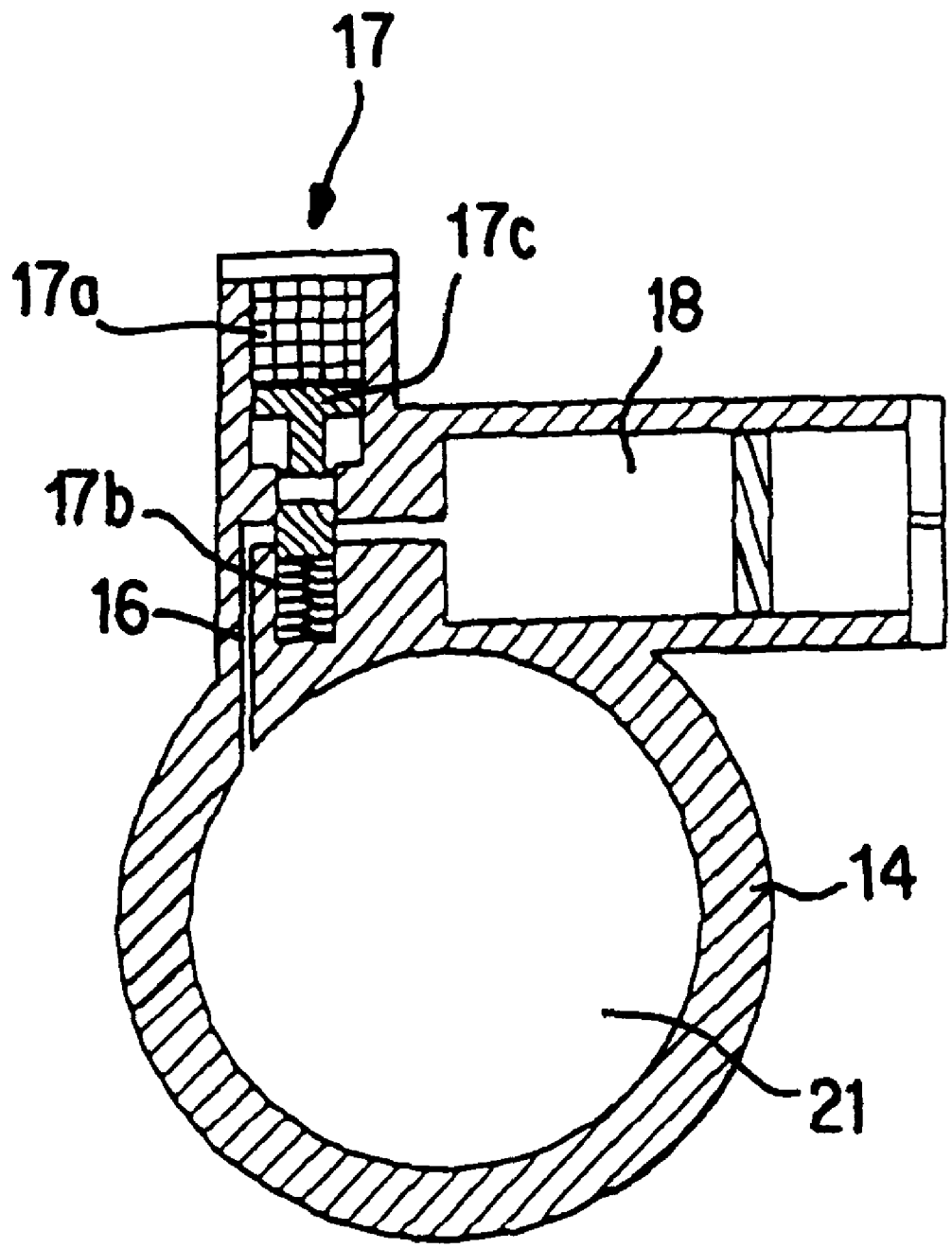
FIG. 2 is a schematic and partially broken-away sectional view of a reservoir for hydraulic fluid of the actuator illustrated in FIG. 1 which can be connected by means of a valve.

An actuator for a wheel brake of a motor vehicle illustrated in FIG. 1 comprises a housing formed of two housing halves 14, 15, on whose one half 15 an electric motor 2 is fastened to a flange.

In the housing 14, 15, a conversion device is provided which has two driving elements in the form of two disks 3, 4 which are arranged in parallel to one another and which can be driven by the electric motor 2.

The first disk 3 has an external toothing by means of which it engages in a gearwheel 2a arranged on the motor shaft of the electric motor 2. Thus, the gearwheel 2a and the disk 3 form a step-down gear in the form of a spur gear. The disk 3 also has a centrally arranged axial internal spindle thread which engages with an external spindle thread 10a of a piston 10. The internal spindle thread arranged on the disk 3 and the external spindle thread 10a of the piston 10 together form a first spindle drive by means of which a rotating movement of the disk 3 is converted into an axial displacement of the first piston 10.

The second disk 4, which is rotationally movably disposed in parallel to the first disk 3 on this first disk by way of roller bearings 7, has an external spindle thread 4a on a cylindrical molded-on section, which external spindle thread 4a engages in an internal spindle thread of a second piston 11 so that a rotating movement of the second disk 4 results in an axial displacement of the second piston 11. While the first disk 3 is driven directly by the electric motor 2 and, as a result, generates in the above-described manner, an axial displacement of the piston 10, the second disk 4 is driven by way of an electrically controllable friction clutch by means of the first disk. For this purpose, close to the circumference of the second disk 4, at least one, for example, ring-shaped solenoid 9 is provided which, when acted upon by a current, by way of a clutch element 5, establishes a frictional connection between the first disk 2 and the second disk 4. The electromagnetic friction clutch 9, 5 is controllable by a (not shown) control unit independently of the control of the electric motor. By means of this arrangement, an axial displacement of the second piston 11 is permitted, as required, by means of the second disk 4 and the spindle drive assigned to it.

As illustrated in FIG. 1, the first disk 3 is disposed on one housing half 15 by means of a bearing 6, such as a ball bearing, whereas the second disk 4 is disposed on a piston guide 12 by means of a bearing 8, for example, again by a ball bearing. In this manner, an extremely compact construction is achieved with as few component parts as possible.

Between the piston 11 and the piston guide 12 as well as between the piston 11 and the piston 10, sealing devices 20 are in each case arranged which permit a tight sliding displacement of the two pistons 10, 11 in one another and of the piston 11 in the piston guide 12.

The hydraulic pistons 10, 11 illustrated in FIG. 1 have different piston surfaces so that the adjusting piston 1 can be acted upon by forces of different intensities by the operation of these two hydraulic pistons 10, 11.

In order to achieve different adjusting speeds, it is provided that the spindle drives assigned to the two pistons 10, 11 have different pitches of the internal spindle and the external spindle threads.

Preferably, it is provided that the spindle drive assigned to the second hydraulic piston 11 permits a fast application, whereas the spindle drive assigned to the first hydraulic piston 10 has a high transmission ratio, whereby a strong application 5 is permitted by means of this smaller hydraulic piston 10.

By means of a "moving-through" of the first piston 10 on the adjusting piston 1, a mechanical through-reach and thus a parking brake operation is permitted. In this case, volume must be reduced in the hydraulic chamber 21 in which the two hydraulic pistons 10, 11 are moving. This takes place in that a reservoir 18 is opened up by a valve 17, the hydraulic fluid situated in the hydraulic chamber 21 expanding back into this reservoir 18.

In addition, an operation of the valve 17 can also take place when it is desirable to let hydraulic fluid flow from the reservoir 18 into the hydraulic chamber 21 in order to, for example, depending on the reason of a wear of the brake disk/brake linings, fill the enlarged volume of the hydraulic chamber 21 with hydraulic fluid.

The hydraulic chamber 21 and the reservoir 18 preferably have a life-long charge so that the above-described brake actuator and the brake, in which it is used, are "dry" components and therefore components which environmentally are particularly friendly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Brake actuator comprising:
   an electric motor,
   a conversion device for converting the rotational movement of the electric motor into a linear movement, and
   a hydraulic transmission for transmitting linear movement of the conversion device to an adjusting piston of a brake,
   wherein the hydraulic transmission comprises at least two hydraulic pistons which independently of one another can be axially displaced in a hydraulic chamber, whose first hydraulic piston by way of a first driving element of the conversion device can be operated directly by the electric motor and whose second hydraulic piston can be operated by way of a second driving element of the conversion device which can be taken along by means of a controllable clutch element by the first driving element.

2. Brake actuator according to claim 1, wherein the clutch element is an electromagnetic friction clutch.

3. Brake actuator according to claim 1, wherein the conversion device includes spindle drives which can be operated by the driving elements and which are assigned to the hydraulic pistons.

4. Brake actuator according to claim 2, wherein the conversion device includes spindle drives which can be operated by the driving elements and which are assigned to the hydraulic pistons.

5. Brake actuator according to claim 3, wherein the spindle drives each have spindle threads of different pitches.

6. Brake actuator according to claim 1, wherein the hydraulic pistons have different size piston surfaces acting on the hydraulic chamber.

7. Brake actuator according to claim 2, wherein the hydraulic pistons have different size piston surfaces acting on the hydraulic chamber.

8. Brake actuator according to claim 4, wherein the hydraulic pistons have different size piston surfaces acting on the hydraulic chamber.

9. Brake actuator according to claim 1, wherein the hydraulic pistons are arranged side-by-side.

10. Brake actuator according to claim 5, wherein the hydraulic pistons are arranged side-by-side.

11. Brake actuator according to claim 8, wherein the hydraulic pistons are arranged side-by-side.

12. Brake actuator according to claim 1, wherein that the hydraulic pistons are arranged to be nested in one another.

13. Brake actuator according to claim 6, wherein that the hydraulic pistons are arranged to be nested in one another.

14. Brake actuator according to claim 8, wherein that the hydraulic pistons are arranged to be nested in one another.

15. Brake actuator according to claim 12, wherein the first driving element is a first disk which engages with an external spindle thread of the first hydraulic piston, has a central internal spindle thread and engages with an external toothing in a gearwheel arranged on the motor shaft of the electric motor.

16. Brake actuator according to claim 15, wherein the second driving element is a second disk which is arranged in parallel to the first disk and which, on a cylindrical projection arranged on it, has an external spindle thread which engages with an internal spindle thread of the second hydraulic piston, the electromagnetic friction clutch being arranged between the first and the second disk.

17. Brake actuator according to claim 16, wherein the first and the second disk are rotationally movably disposed on one another and, in each case, on the one side, on a half of a housing accommodating the whole conversion device and the hydraulic transmission and, on the other side, on a guide of the hydraulic pistons.

18. Brake actuator according to claim 2, wherein the hydraulic chamber is connected with a reservoir which can be connected by way of a valve which is controllable independently of the electric motor and the clutch element.

19. Brake actuator assembly comprising:
   an electric motor,
   a brake adjusting piston, and
   a conversion device operable to convert rotational movement of the motor into linear movement of the brake adjusting piston, said conversion device including:
   a hydraulic chamber operable on the brake adjusting piston,
   first and second hydraulic pistons bounding the hydraulic chamber,
   a first driving assembly interposed between the electric motor and the first hydraulic piston to axially move the first hydraulic piston in response to rotational movement of the motor, and
   a second driving assembly including a controllable clutch which drivingly connects the first driving assembly with the second hydraulic piston to axially move the second hydraulic piston.

20. Brake actuator assembly according to claim 19, wherein the clutch is an electromagnet friction clutch.

21. Brake actuator assembly according to claim 19, wherein said first driving assembly includes a first disk drivingly connected to the motor by a gear engaging a periphery of said first disk, said first disk having a spindle thread drive connection with the first piston.

22. Brake actuator assembly according to claim 21, wherein said second driving assembly includes a second disk with a spindle thread drive connection with the second piston.

23. Brake actuator assembly according to claim 22, wherein the clutch is drivingly interposed between the first and second disk.

* * * * *